(12) United States Patent
Kim et al.

(10) Patent No.: US 8,036,529 B2
(45) Date of Patent: Oct. 11, 2011

(54) WAVELENGTH CONVERSION APPARATUS IN TIME DIVISION MULTIPLEXING—PASSIVE OPTICAL NETWORK SYSTEM BASED ON WAVELENGTH DIVISION MULTIPLEXING SYSTEM, AND OPTICAL TRANSMISSION APPARATUS AND METHOD USING THE SAME

(75) Inventors: Byoung Whi Kim, Daejeon (KR); Youngil Park, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 999 days.

(21) Appl. No.: 11/923,989

(22) Filed: Oct. 25, 2007

(65) Prior Publication Data

US 2008/0138073 A1 Jun. 12, 2008

(30) Foreign Application Priority Data

Dec. 8, 2006 (KR) .................. 10-2006-0125108

(51) Int. Cl.
*H04J 14/02* (2006.01)
*H04J 14/08* (2006.01)
(52) U.S. Cl. ............................. 398/47; 398/75
(58) Field of Classification Search .............. 398/47, 398/75
See application file for complete search history.

(56) References Cited

U.S. PATENT DOCUMENTS 5,559,624 A 9/1996 Darcie et al.
6,314,115 B1 11/2001 Delfyett et al.
7,751,712 B2 * 7/2010 Zhao et al. .................. 398/72
2002/0024696 A1 * 2/2002 Maeda ....................... 359/124
2002/0145775 A1 10/2002 Effenberger et al.
(Continued)

FOREIGN PATENT DOCUMENTS

JP 2002-261697 * 9/2002
(Continued)

OTHER PUBLICATIONS

EPON Upgrade Strategy Using WDM Overlay, Jae-Myoung Hyun at al., The Journal of the Korean Institute of Communication Sciences, vol. 31, No. 10A, Oct. 2006.

*Primary Examiner* — Leslie Pascal
(74) *Attorney, Agent, or Firm* — Rabin & Berdo, P.C.

(57) ABSTRACT

Provided are a wavelength conversion apparatus in a Time Division Multiplexing Passive Optical Network (TDM-PON) system based on a Wavelength Division Multiplexing (WDM) system, and an optical transmission method using the wavelength conversion apparatus. Each subscriber does not need to have its own wavelength but transmits an uplink signal using a wavelength band used in the TDM-PON system and routs optical network unit (ONU) uplink signals belonging to the same ONU to a wavelength conversion apparatus positioned in a subscriber area. The wavelength conversion apparatus converts the ONU uplink signals into wavelengths and uplinks the wavelengths of an optical line terminal (OLT) of a central office (CO) so as to enable a WDM transmission. Thus, a method of constituting a wavelength conversion apparatus and a remote node (RN) using the wavelength conversion apparatus can be suggested to realize a hybrid-PON system into which TDM-PON system and WDM systems are combined. In the hybrid-PON system, an ONU uses a wavelength used in the TDM-PON system and requires a lower optical power than an ONU of the TDM-PON system. Therefore, the WDM system can be easily applied in an area in which the TDM-PON system is installed.

20 Claims, 8 Drawing Sheets

ONU SEPARATION TYPE WAVELENGTH CONVERSION NODE

U.S. PATENT DOCUMENTS

| | | | |
|---|---|---|---|
| 2003/0147585 A1* | 8/2003 | Kikuchi et al. | 385/24 |
| 2007/0077072 A1* | 4/2007 | Kunimatsu et al. | 398/135 |

FOREIGN PATENT DOCUMENTS

| | | |
|---|---|---|
| KR | 2000-0020598 | 4/2000 |
| KR | 2002-0027103 | 4/2002 |
| KR | 2004-0034916 | 4/2004 |
| KR | 1020040056828 | 7/2004 |
| KR | 2005-0061632 | 6/2005 |
| KR | 1020050055098 | 6/2005 |
| KR | 100584455 | 5/2006 |

* cited by examiner

FIG. 2A

METHOD OF USING OPTICAL CIRCULATOR

FIG. 2B

SP:Splitter
3 LAYER METHOD

FIG. 2C

2 LAYER METHOD

FIG. 3A

ONU SEPARATION TYPE WAVELENGTH CONVERSION NODE

FIG. 3B

WAVELENGTH CONVERSION NODE USED AS ONU

AFTER BEING PROCESSED BY AWG OF RN

FIG. 7B

AFTER BEING PROCESSED BY AWG OF OLT

WAVELENGTH CONVERSION APPARATUS IN TIME DIVISION MULTIPLEXING—PASSIVE OPTICAL NETWORK SYSTEM BASED ON WAVELENGTH DIVISION MULTIPLEXING SYSTEM, AND OPTICAL TRANSMISSION APPARATUS AND METHOD USING THE SAME

CROSS-REFERENCE TO RELATED PATENT APPLICATION

This application claims the benefit of Korean Patent Application No. 10-2006-0125108, filed on Dec. 8, 2006, in the Korean Intellectual Property Office, the disclosure of which is incorporated herein in its entirety by reference.

BACKGROUND OF THE INVENTION

1. Field of the Invention

The present invention relates to a wavelength conversion apparatus and method in a Time Division Multiplexing Passive Optical Network (TDM-PON) system based on a Wavelength Division Multiplexing (WDM) system, and more particularly, to a wavelength conversion apparatus in a hybrid-PON system in which a TDM-PON system is mixed with a WDM system and a method of constituting a remote node (RN) using the same.

This work was supported by the IT R&D program of MIC. [2005-S-401-02, Optical Subscriber and Access Network Technology]

2. Description of the Related Art

Transmission speeds increase every year with an increase of demands for multimedia data and Internet according to demands of subscribers in homes and offices.

An X digital subscriber line (xDSL), a cable modem, etc. have been used to cope with the demands for an increase in transmission speeds. However, a bandwidth has almost reached the limits. Thus, Fiber to the x (FTTx), which performs connections to subscriber areas through optical cable, is regarded as a solution.

A PON system performs connections through optical cable to reduce the number of fibers and transceivers using an FTTx Star method and thus is regarded as being the most low-priced. Thus, several countries in the world have developed and standardized PON systems.

Representative examples of PON include a TDM-PON and a WDM-PON. The TDM-PON is representative of a Broadband PON (BPON), an Ethernet PON (EPON), and a Gigabit PON (GPON), and the WDM-PON is used to transmit data to subscribers in units of wavelengths.

However, TDM-PON and WDM-PON systems are intended for a small number of subscribers and thus are not suitable for a large scale subscriber network to which a large number of users subscribe.

The TDM-PON system connects optical cable using the Star method in order to provide super-high speed transmission services to between 16 to 32 subscribers.

The TDM-PON system allows several subscribers to share a bandwidth in the time domain. Initial installation costs for the TDM-PON system are low. However, a transmission speed is lowered with an increase in the number of subscribers, and the number of fibers must be increased in proportion to the number of subscribers in order to accommodate a large number of subscribers.

Subscribers connected to a PON share a fiber using a time multiplexing method. Thus, a transmission speed of a single subscriber is lowered with increases in the number of subscribers and a bandwidth used by each of the subscribers.

Optical cable of tens to hundreds of cores must be installed to provide services to apartments.

The WDM-PON system can solve the limitation in the bandwidth of the TDM-PON system. However, in the WDM-PON system, a transmitter must have WDM laser diodes (LDs) which radiate laser beams having different wavelengths in each optical network unit (ONU).

The WDM LDs of the ONUs have big disadvantageous in terms of price increases and management of the ONUs.

If the wavelengths of the laser beams radiated from the WDM LDs move, performance of the neighbor channel may be deteriorated, and service companies have difficulty managing stocks of the ONUs.

The WDM-PON allocates a wavelength to each of the ONUs in order to extend a bandwidth. However, each of the ONUs must have its own wavelength and thus costs increase and each of the ONUs is difficult to manage. There are not enough broadband contents to use all portions of a wavelength. Thus, the WDM-PON system has lower use efficiency of a bandwidth than the TDM-PON system.

An Injection Locking method has been suggested and developed by which general multi-mode LDs are used to radiate laser beams onto ONUs and allow incident laser beams having reference wavelengths to be radiated onto the ONUs from an external source. However, it is very costly to provide the reference wavelengths, and it is difficult to increase transmission speeds of the ONUs so as to adjust wavelengths.

Granularity is another problem of the WDM-PON system.

The TDM-PON system provides smaller units of bandwidths to subscribers, while the WDM-PON provides a single wavelength to each ONU. Thus, the WDM-PON requires an additional apparatus to divide the single wavelength into small bandwidths so that a large number of subscribers can use the small bandwidths.

The present invention provides a hybrid-PON system which can compensate for the disadvantages of the WDM-PON and TDM-PON systems.

The hybrid-PON system accommodates advantages of the TDM-PON and WDM-PON systems. Each ONU of the hybrid-PON system performs transmission and reception through a TDM-PON protocol. However, in the TDM-PON system, each group has its own wavelength and each ONU performs transmitting with each Optical Line Terminals (OLT) using a fiber so as to increase use efficiency of a bandwidth and reduce transmission costs.

The hybrid-PON system of the present invention (i.e., a TDM-PON system based on a WDM-PON system) can economically provide PON services in an area in which hundreds or more of subscribers are gathered, such as a large shopping center, an apartment, or the like.

SUMMARY OF THE INVENTION

The present invention provides a wavelength conversion apparatus, which can reduce the number of optical fibers necessary for transmission and increase the number of acceptable subscribers, in a hybrid Passive Optical Network (hybrid-PON) system in which Wavelength Division Multiplexing (WDM)-PON and Time Division Multiplexing (TDM)-PON systems are mixed, and an optical transmission apparatus and method using the wavelength conversion apparatus.

According to an aspect of the present invention, there is provided a wavelength conversion apparatus in a TDM-PON system based on a WDM system, comprising: an optical receiver converting a first wavelength optical signal including a time division multiplexed data component into an electric signal; and a WDM optical transmitter converting the electric signal into a second wavelength optical signal.

According to another aspect of the present invention, there is provided an optical transmission apparatus using a wavelength conversion apparatus in a TDM-PON system based on a WDM system, comprising: a combiner/splitter combining a plurality of first wavelength optical signals received from a plurality of optical network units (ONUs) or demultiplexing the plurality of first wavelength signals transmitted to the ONUs; and a wavelength conversion apparatus converting the multiplexed first wavelength optical signal into a plurality of second wavelength optical signal.

According to another aspect of the present invention, there is provided an optical transmission method using a wavelength conversion apparatus in a TDM-PON system based on a WDM system, comprising: combining a plurality of first wavelength optical signals received from a plurality of ONUs; converting the combined first wavelength optical signal into an electric signal; converting the electric signal into a second wavelength optical signal; and multiplexing a plurality of the second wavelength optical signals and transmitting the plurality of second wavelength optical signals to an optical line terminal (OLT).

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, preferred embodiments of the present invention will be described in detail with reference to the attached drawings.

Figure 1:
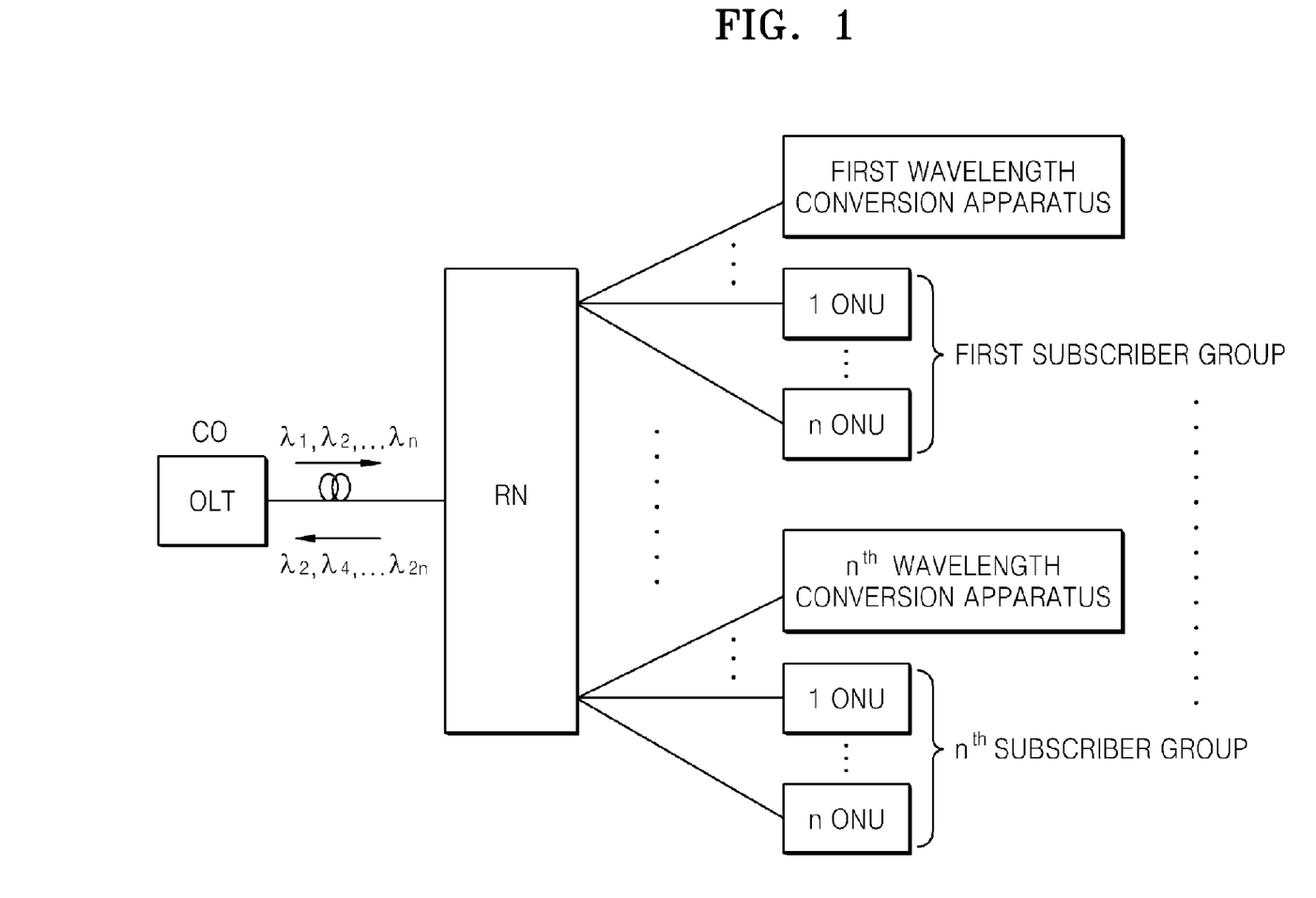
FIG. 1 is a block diagram of a Time Division Multiplexing Passive Optical Network (TDM-PON) system based on a Wavelength Division Multiplexing (WDM)-PON system, including a wavelength conversion apparatus, according to an embodiment of the present invention.

FIG. 1 is a block diagram of a Time Division Multiplexing Passive Optical Network (TDM-PON) system based on a Wavelength Division Multiplexing (WDM)-PON system, including a wavelength conversion apparatus, according to an embodiment of the present invention.

As shown in FIG. 1, a WDM optical signal is used to transmit uplink and downlink data, and TMD data is transmitted in each wavelength in order to provide services to a larger number of subscribers than in a TDM-PON. Here, the number of subscribers is increased by a multiple of the number of wavelengths.

For this purpose, an optical line terminal (OLT) positioned in a central office (CO) must communicate with each subscriber group using its own wavelength.

The OLT is positioned in the CO and transmits data to a large number of subscribers using a transmission node. Thus, the OLT transmits data using a WDM laser diode (LD) which radiates a laser beam having a predetermined wavelength.

However, allowing a large number of ONUs positioned in a subscriber area to have their own wavelengths causes difficulties in terms of cost and management.

Thus, in the present invention, ONUs transmit uplink data using a wavelength of 1310 nm used in an existing TDM-PON instead of a specific wavelength. Also, a remote node (RN) routes uplink signals transmitted from the ONUs to wavelength conversion apparatuses which are respectively pre-designated to the subscriber groups, converts signals into signals having wavelengths designated by the wavelength conversion apparatuses, and transmits the converted signals to the OLT.

Uplink signals transmitted from the ONUs to the OLT are time division multiplexed. Thus, although the wavelength conversion apparatuses uplink the uplink signals, the uplink signals do not collide against one another.

The RN of FIG. 1 is positioned around the subscriber area as in an existing PON in order to distribute a downlink signal and multiplex the uplink signals. In particular, in the present invention, the RN performs the functions described below.

In other words, the RN divides the downlink signal by wavelengths, transmits the divided signals to the subscriber groups, routes the uplink signals of wavelengths of 1310 nm transmitted from the ONUs to the wavelength conversion apparatuses, and transmits the uplink signals transmitted from the wavelength conversion apparatuses to the OLT.

Figure 2A:
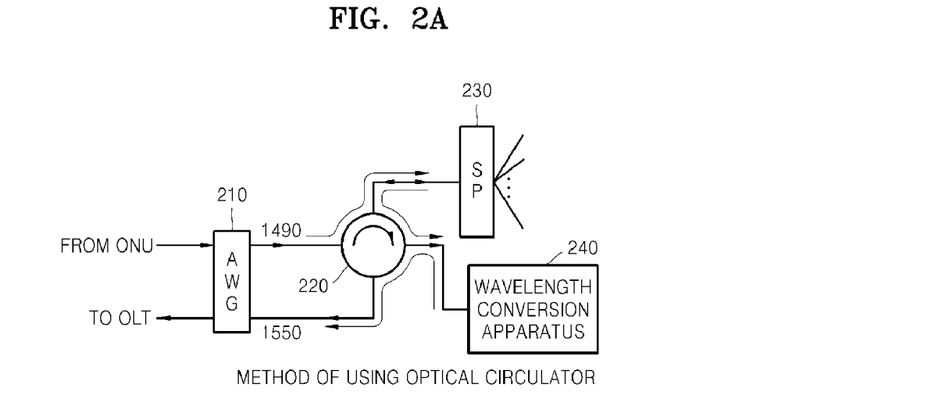
FIGS. 2A through 2C illustrate structures of remote nodes (RNs) in a TDM-PON system based on a WDM system including a wavelength conversion apparatus, according to embodiments of the present invention.
Figure 2B:
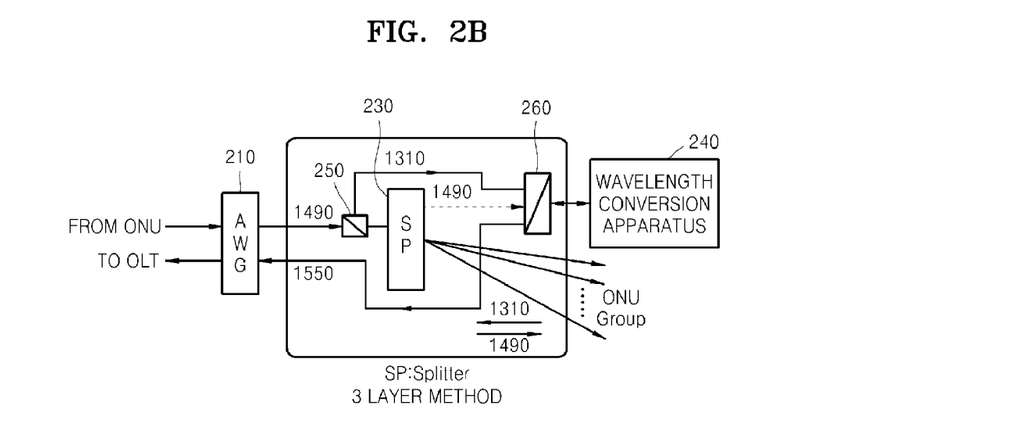
Figure 2C:
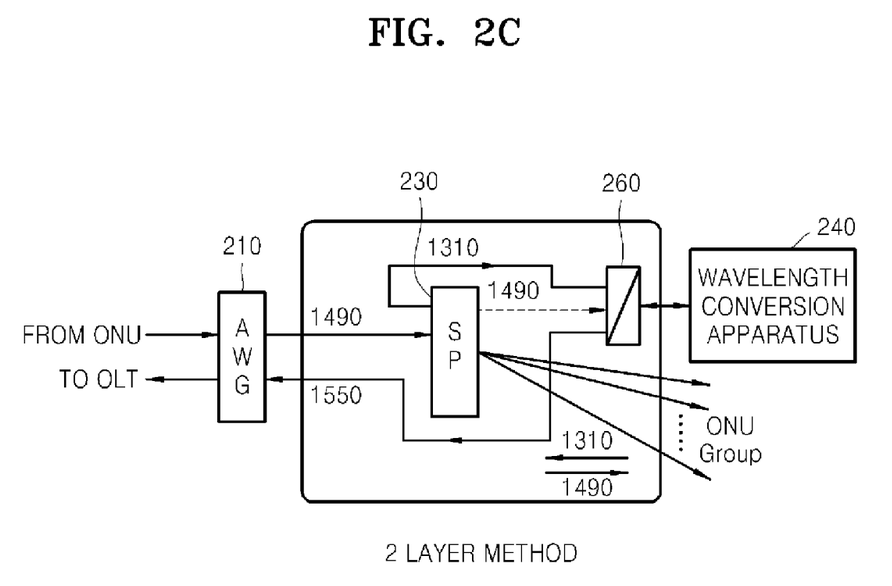

FIGS. 2A through 2C illustrate structures of RNs in a TDM-PON system based on a WDM system including a wavelength conversion apparatus, according to an embodiment of the present invention.

Structures of RNs in a hybrid-PON system in which WDM and TDM-PON systems are mixed will be described with reference to FIGS. 2A through 2C. Here, the RNs of FIGS. 2A through 2C are respectively constituted using three different methods.

FIG. 2A illustrates an RN including an arrayed waveguide grating (AWG) 210, which divides a wavelength, an optical circulator 220, which transmits an optical signal in a designated direction, and an optical splitter (SP) 230, which splits an input optical signal to a plurality of output ports.

A plurality of wavelength of downstream are divided by the AWG 210, and the signal is supplied to the SP 230 through the optical circulator 220, distributed by the SP 230 in the ratio of 1:N, and transmitted to ONUs belonging to the same group.

Uplink optical signals transmitted from the ONUs are input into the optical circulator 220 through the SP 230 and transmitted to the wavelength conversion apparatus 240 so that wavelengths of the uplink optical signals are converted by the wavelength conversion apparatus 240.

The uplink optical signals of which wavelengths are converted by the wavelength conversion apparatus 240 are sequentially transmitted to an OLT through the optical circulator 220 and the AWG 210.

The AWG 210 is simultaneously used for the uplink and downlink optical signals. Also, a wavelength, which has passed an arbitrary port and to which a Free Spectral Range (FSR) value has been added, is used to accurately calculate input wavelengths of ports using an AWG principle of passing the wavelength through the same port and to determine uplink and downlink WDM LD wavelengths using the input wavelengths.

FIG. 2B illustrates an RN using two coarse WDM (CWDM) filters, which are cheaper than an optical circulator and more stable when being used over a long period of time. The RN of FIG. 2B performs the same function as that of FIG. 2A and is constituted using a three layer method.

A 1490 nm band signal corresponding to a downlink signal is transmitted to ONUs through an SP 230 using a 1490/1310 nm CWDM filter 250 which is positioned between the AWG 210 and the SP 230.

1310 nm band signals, which are uplinked from the ONUs through the SP 230, are split by the 1490/1310 nm CWDM filter 250, go through a CWDM filter 260, and transmitted to a wavelength conversion apparatus 240.

A 1550 nm band signal, which is transmitted from the wavelength conversion apparatus 240, is split by the CWDM filter 260, input into an AWG 210, and transmitted to an OLT.

In other words, two CWDM filters split respectively uplink and downlink signals to prevent the uplink and downlink signals from interfering with each other.

FIG. 2C illustrates an RN which does not include a 1490/1310 nm CWDM filter 250 between an AWG 210 and a SP 230 and is constituted using a two layer method.

The 1490/1310 nm CWDM filter 250 prevents the 1310 nm band signals uplinked from the ONUs from being directly transmitted to an OLT. A power of optical signal, which is transmitted from the ONUs and reach the OLT, is sufficiently smaller than a power of optical signal transmitted from a wavelength conversion apparatus. Thus, the fact that the 1490/1310 nm CWDM filter 250 hardly affects an uplink transmission performance has been confirmed by calculation and experiment.

Figure 3A:
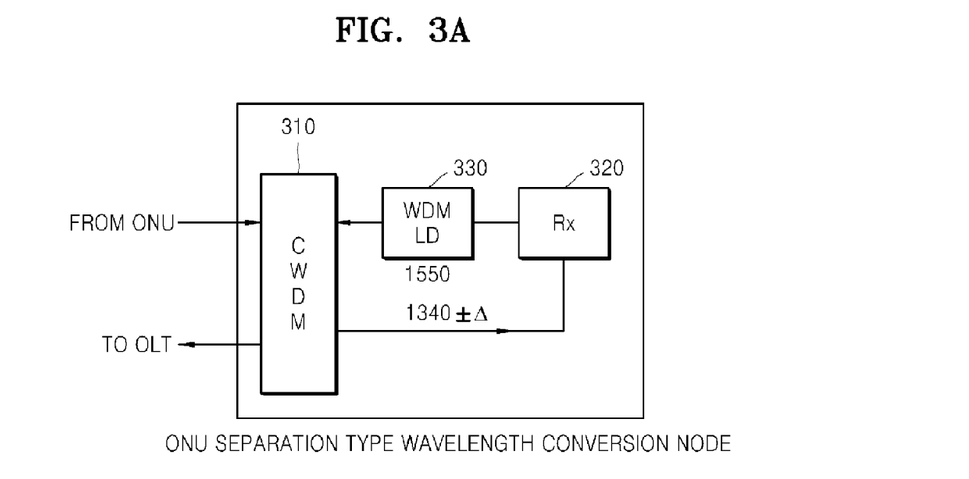
FIGS. 3A and 3B illustrate structures of wavelength conversion apparatuses according to embodiments of the present invention.
Figure 3B:
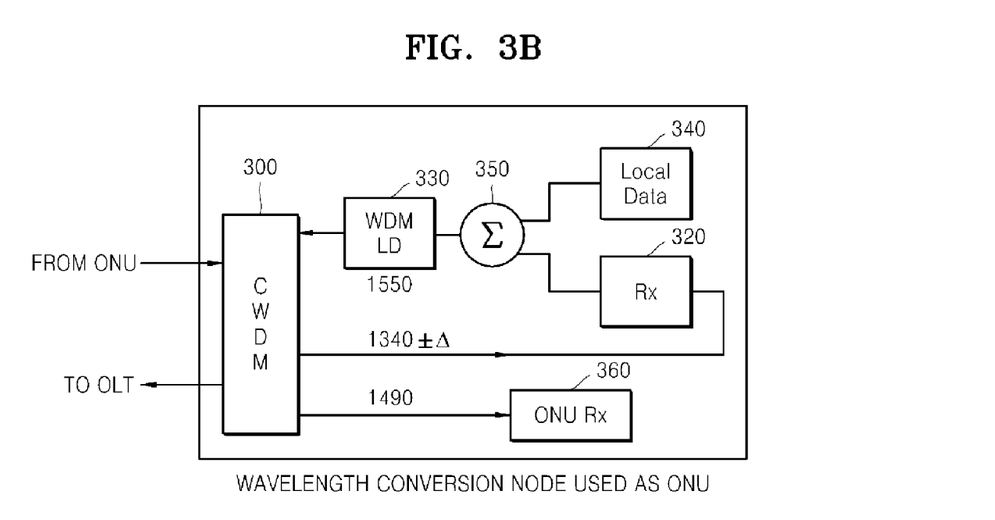

FIGS. 3A and 3B illustrate structures of wavelength conversion apparatuses according to embodiments of the present invention.

FIG. 3A illustrates an independent wavelength conversion apparatus which is used for wavelength conversion and positioned in an area completely separately from ONUs.

1310 nm band uplink signals, which are incident from ONUs through a CWDM filter 310, are converted into electric signals by an optical receiver (Rx) 320, i.e., a photo diode (PD), modulated into 1550 nm band signals by a WDM LD 330, and uplinked.

FIG. 3B illustrates a wavelength conversion apparatus which is also used as an ONU, includes a CWDM filter 300 having three input and output ports, and splits a downlink signal transmitted from an OLT and an uplink signal transmitted from the ONU using the CWDM filter 300.

The uplink signal having a wavelength of 1310 nm is converted into an electric signal by a receiver 320, electrically multiplexed with TDM-PON signals 340 input into a corresponding ONU, and modulated into a 1550 nm band signal by a WDM LD 330.

A 1490 nm band optical signal, which is downlinked from the OLT to the ONU, is split by the CWDM filter 300, and converted into an electric signal by an ONU optical receiver 360.

The independent wavelength conversion apparatus of FIG. 3A is separated from a general subscriber and thus can secure stability. The wavelength conversion apparatus of FIG. 3B can reduce the cost of fibers and ONUs.

Figure 4:
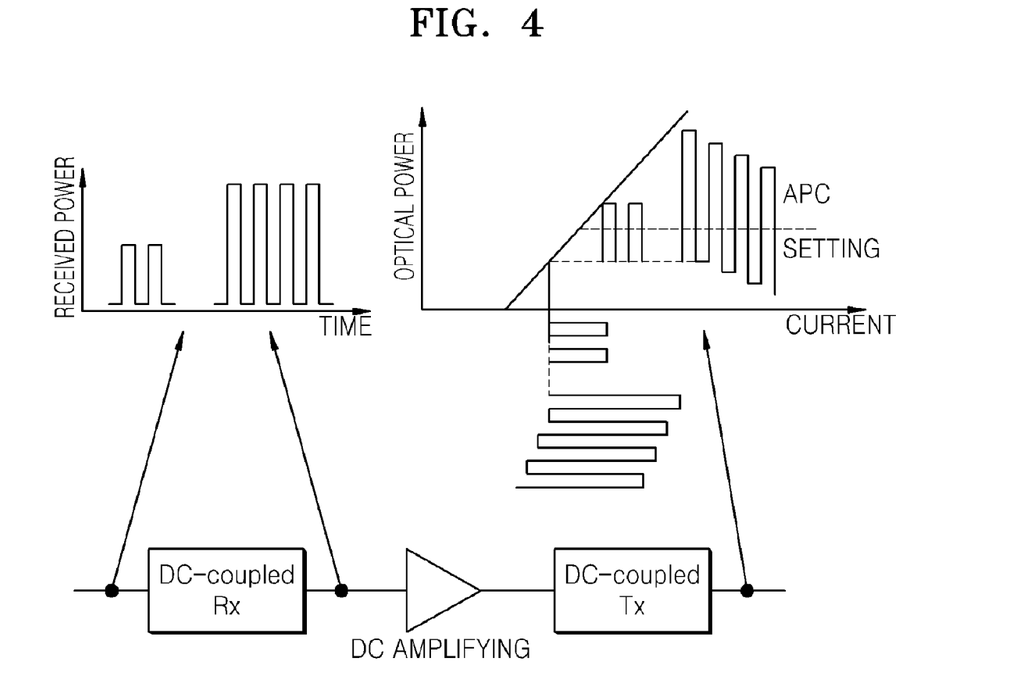
FIG. 4 illustrates waveforms of input and output signals when a wavelength conversion apparatus uses 1R reproduction according to an embodiment of the present invention.

FIG. 4 illustrates waveforms of input and output signals when a wavelength conversion apparatus uses 1R reproduction, according to an embodiment of the present invention.

The wavelength conversion apparatus uses 1R and 2R reproductions to reproduce a signal.

The 1R reproduction is a method of direct current (DC)-coupling and amplifying a signal, which is transmitted from each ONU to the wavelength conversion apparatus, and performing DC-coupled transmission of the signal.

DC-coupled transmission and reception are performed so that optical signals transmitted from several ONUs to the wavelength conversion apparatus have different magnitudes and phases, and characteristics of the optical signals are maintained at a maximum without being distorted.

The 1R reproduction method is simple and economical. Differences among extinction ratios (ERs) of the ONUs are transmitted to the OLT and thus cause differences among performances of the ONUs.

As shown in FIG. 4, an ONU of a TDM-PON generally controls an ER to transmit a signal so as to reduce an occurrence of a power penalty caused by the ER.

However, when these signals are received by the wavelength conversion apparatus, optical powers of the signals are different according to the ONUs. An automatic power control (APC) circuit of a transmitter maintains average optical power. Thus, the wavelength conversion apparatus transmits signals having different ERs for each ONU signal.

Figure 5:
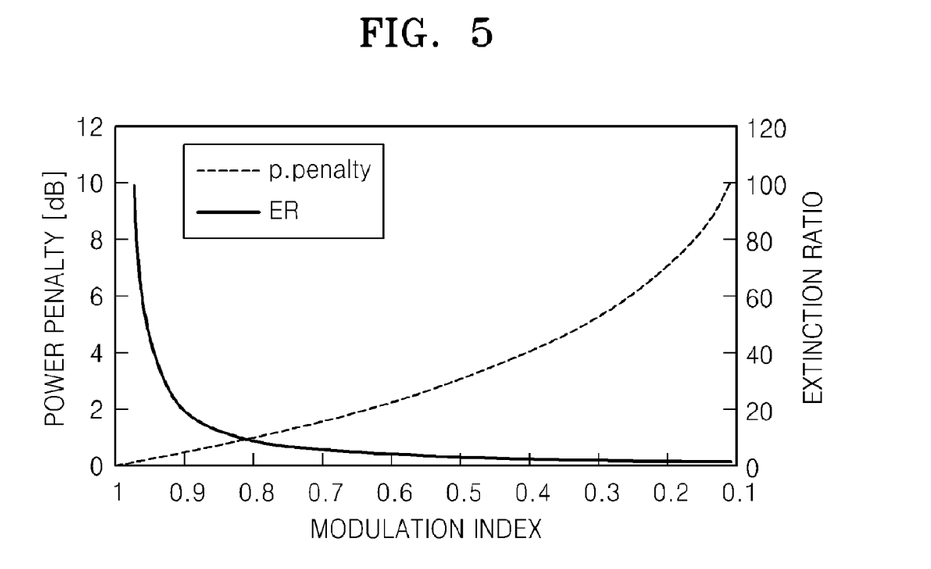
FIG. 5 is a graph illustrating variations in power penalty when the 1R reproduction illustrated in FIG. 4 is used.

FIG. 5 is a graph illustrating variations in power penalty when the 1R reproduction of FIG. 4 is used.

As shown in FIG. 5, an ER and power penalty vary with respect to variations of powers of signals input into the ONUs.

In FIG. 5, a modulation index is defined as a ratio of each ONU channel peak value to twice an optical power set by an APC as in Equation 1:

$$(2 \times P_{APC}) \div (P_{peak}) \qquad (1)$$

The power penalty is increased with a reduction of the modulation index like a calculated value. If the modulation index is "0.5," penalty in an OLT is about 3 dB.

Figure 6:
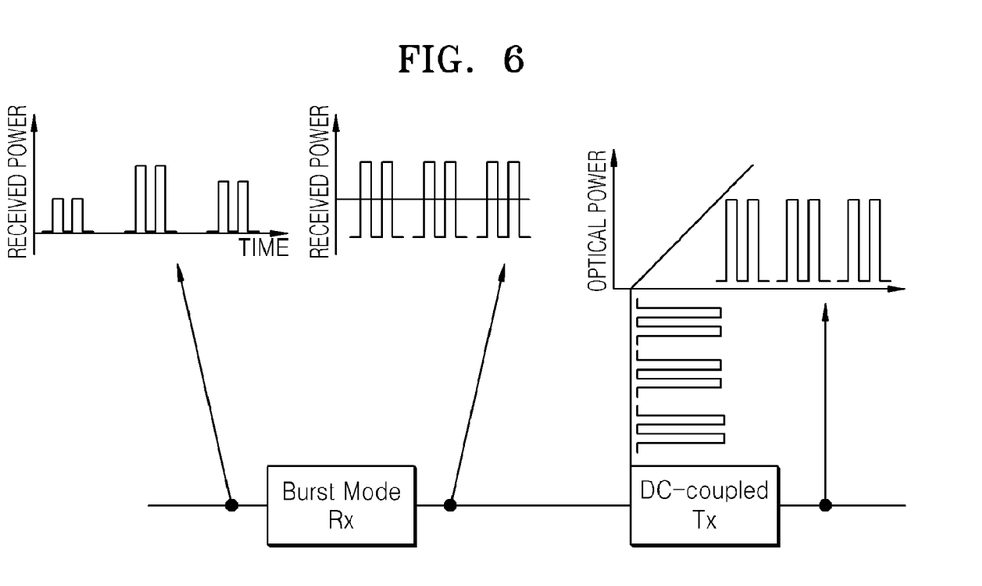
FIG. 6 illustrates waveforms of input and output signals when a wavelength conversion apparatus uses 2R reproduction, according to an embodiment of the present invention.

FIG. 6 illustrates waveforms of input and output signals when a wavelength conversion apparatus uses 2R reproduction.

The 2R reproduction method of FIG. 6 solves an ER problem illustrated in FIG. 5.

In other words, a 2R receiver uses a burst mode limiting amplifier and reproduces signals of ONUs having burst characteristics to the same power.

Since the ONUs control ERs to transmit the signals, a power penalty hardly occurs due to the ERs in a receiver of the wavelength conversion apparatus.

The signals arrayed to the same power are modulated and transmitted by a DC coupling transmitter.

Since power of an input signal of the DC coupling transmitter does not vary with time, an ER may be controlled to transmit an optical signal having an optimal ER.

Figures 7A, 7B:
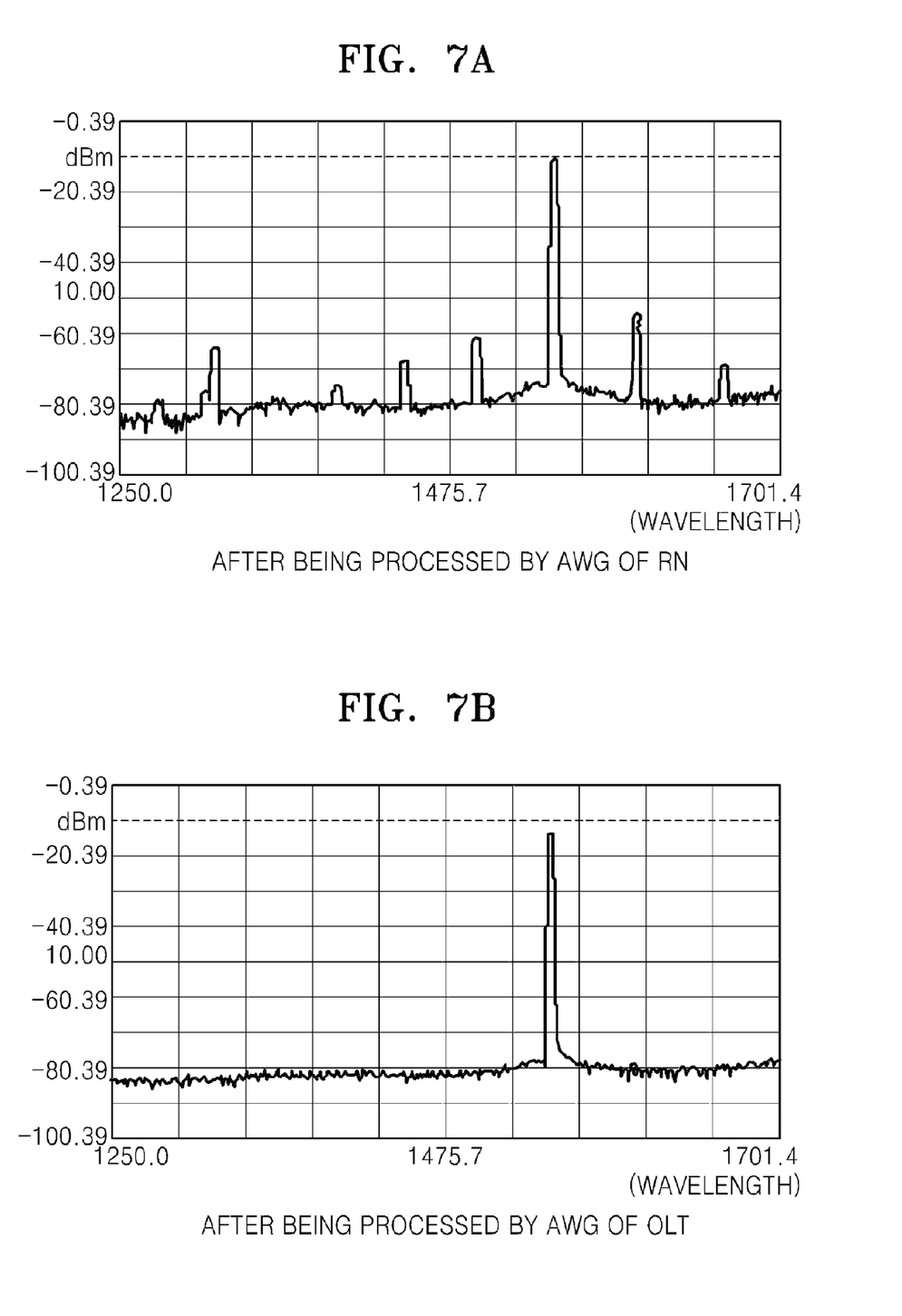
FIGS. 7A and 7B are graphs illustrating optical spectrums measured by transmission simulations using the RN illustrated in FIG. 2C.

FIGS. 7A and 7B are graphs illustrating optical spectrums measured by transmission simulations using the RN illustrated in FIG. 2C.

Referring to FIG. 7A, a 1310 nm band signal uplinked from an ONU, a 1550 nm band signal uplinked from a wavelength conversion apparatus, and sideband modes of the signals are observed as signals immediately having passed an AWG of an RN. Here, a difference between powers of the 1550 nm band signal and other signals is 40 dB or more.

The difference occurs due to the following reason. The signal uplinked from the ONU experiences split loss in an SP and wavelength disharmony loss in an AWG, while the signal uplinked from the wavelength conversion apparatus does not experience such losses.

FIG. 7B is a graph illustrating an optical spectrum of a signal which has been processed by an AWG again so as to split a wavelength through an OLT.

Thus, the 1490/1310 nm CWDM filter 250 illustrated in FIG. 2B may be omitted from the RN. In the present invention, FIG. 2C is suggested as one of RN constituting methods.

Figure 8:
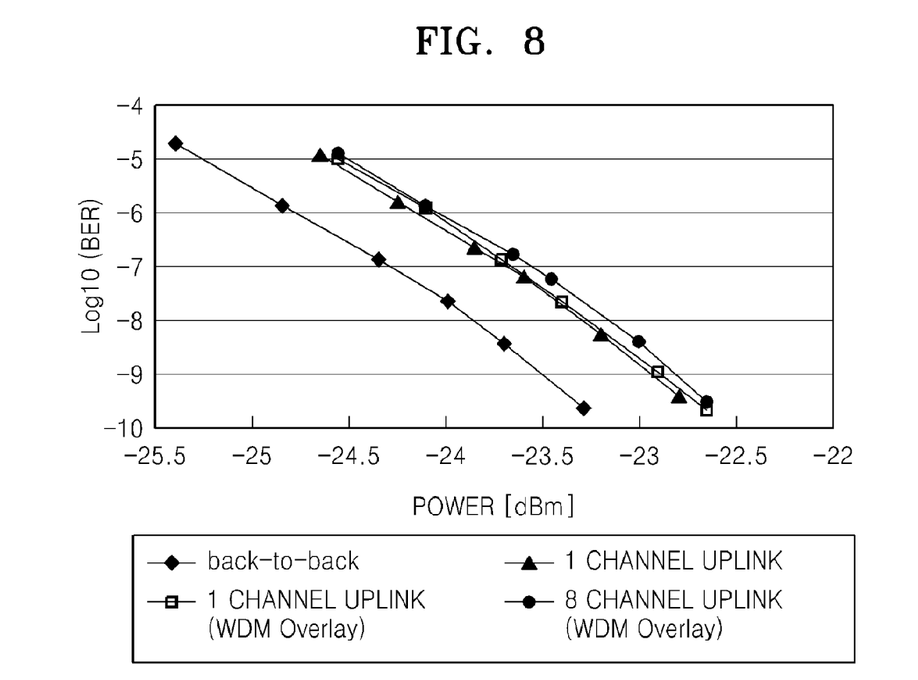
FIG. 8 is a graph illustrating an optical spectrum of an uplink signal measured by a transmission simulation using the RN illustrated in FIG. 2C.

FIG. 8 is a graph illustrating an optical spectrum of an uplink signal measured by a transmission simulation using the RN illustrated in FIG. 2C.

A WDM system-based TDM-PON system using a wavelength conversion apparatus was constituted to perform a transmission experiment. The results of an uplink transmission performed using 8 wavelengths were obtained as shown in FIG. 8.

The wavelength conversion apparatus used a 2R reproduction method, and the RN was constituted using the two layer method illustrated in FIG. 2C.

Transmission performances of transmissions performed through 8 channels show a difference of about 0.7 dB from a TDM-PON Back-to-back transmission not using WDM. Thus, a WDM-based method suggested in the present invention can be sufficiently used.

Figure 9:
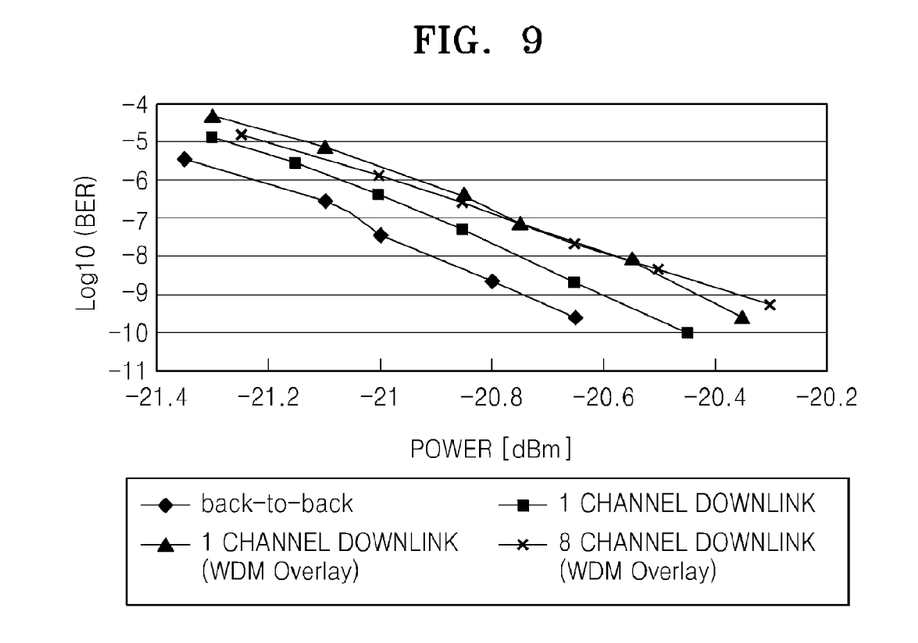
FIG. 9 is a graph illustrating an optical spectrum of a downlink signal measured by a transmission simulation using the RN illustrated in FIG. 2C.

FIG. 9 is a graph illustrating an optical spectrum of a downlink signal measured by a transmission simulation using the RN illustrated in FIG. 2C.

A performance of a downlink transmission simulation was obtained as shown in FIG. 9.

The performance deterioration of about 0.5 dB appears in transmissions performed through 988 channels. Thus, although a WDM-based method is introduced, performances of uplink and downlink transmissions are maintained.

As described above, in a wavelength conversion apparatus in a WDM system-based TDM-PON system and an optical transmission apparatus and method using the wavelength conversion apparatus according to the present invention, Fiber To The Home (FTTH) can be provided to a large number of subscribers. A fiber must be efficiently used to provide FTTH to a housing complex including 1,000 or more households. In this case, a WDM transmission method must be introduced.

WDM may be applied to a PON at lowest cost by using the present invention. Also, if the WDM is applied in a FTTH area adopting an existing TDM-PON method to improve service quality, ONUs of a TDM-PON may be re-used without being replaced. Thus, the present invention can be an economically upgraded method.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A wavelength conversion apparatus in a TDM-PON (Time Division Multiplexing Passive Optical Network) system based on a WDM (Wavelength Division Multiplexing) system, comprising:
    an optical receiver converting a first wavelength optical signal comprising a time division multiplexed data component into an electric signal;
    a WDM optical transmitter converting the electric signal into a second wavelength optical signal;
    a transmission line transmitting the first and second wavelength optical signals; and
    a CWDM (coarse WDM) filter splitting the first wavelength optical signal transmitted to the transmission line from the second wavelength optical signal to be uplinked to the transmission line.

2. The wavelength conversion apparatus of claim 1, wherein the first wavelength optical signal is a wavelength band optical signal of a TDM-PON.

3. The wavelength conversion apparatus of claim 1, wherein the second wavelength optical signal is a wavelength band optical signal of a WDM-PON.

4. The wavelength conversion apparatus of claim 1, further comprising:
    a multiplexer multiplexing uplink data to be uplinked from an optical network unit (ONU) to an optical line terminal (OLT) and the electric signal converted by the optical receiver; and
    a subscriber optical receiver converting a third wavelength optical signal downlinked from the OLT to the ONU into another electric signal.

5. The wavelength conversion apparatus of claim 4, wherein:
    the transmission line also transmits the third wavelength optical signal; and
    the CWDM filter also splits the third wavelength optical signals transmitted to the transmission line from the first and second wavelength optical signals.

6. The wavelength conversion apparatus of claim 1, further comprising a DC (direct current) amplifier DC-amplifying the electric signal.

7. The wavelength conversion apparatus of claim 1, wherein the optical receiver is a burst mode optical receiver.

8. An optical transmission apparatus using a wavelength conversion apparatus in a TDM-PON (Time Division Multiplexing Passive Optical Network) system based on a WDM (Wavelength Division Multiplexing) system, the TDM-PON system including an optical line terminal (OLT) and a plurality of optical network units (ONUs), the optical transmission apparatus comprising:
    a combiner/splitter multiplexing a plurality of first wavelength optical signals received from the plurality of ONUs or demultiplexing a signal from the OLT into a plurality of first wavelength signals transmitted to the ONUs; and a wavelength conversion apparatus converting the multiplexed first wavelength optical signals into a plurality of second wavelength optical signals, the wavelength conversion apparatus including
an optical receiver converting the multiplexed first wavelength optical signals into electric signals,
a WDM optical transmitter converting the electric signals into the plurality of second wavelength optical signals,
a transmission line transmitting the first and second wavelength optical signals, and
a CWDM (coarse WDM) filter splitting the first wavelength optical signal transmitted to the transmission line from the second wavelength optical signal to be uplinked to the transmission line.

9. The optical transmission apparatus of claim 8, wherein a plurality of combiners/splitters, a plurality of wavelength conversion apparatuses and a plurality of multiplexers/demultiplexers are constituted, the plurality of multiplexers/demultiplexers multiplexing the plurality of second wavelength optical signals and transmitting the multiplexed second wavelength optical signals to the OLT or demultiplexing a third wavelength optical signal received from the OLT and transmitting the demultiplexed third wavelength optical signal to the combiners/splitters.

10. The optical transmission apparatus of claim 8, wherein the first wavelength optical signals comprise time division multiplexed data components.

11. The optical transmission apparatus of claim 8, wherein the first wavelength optical signals are wavelength band optical signals of a TDM-PON, and the second wavelength optical signals are wavelength band optical signals of a WDM-PON.

12. The optical transmission apparatus of claim 8, wherein the wavelength conversion apparatuses are positioned in the ONUs.

13. The optical transmission apparatus of claim 8, further comprising a second CWDM filter splitting the combined first wavelength optical signals and the demultiplexed third wavelength optical signal.

14. An optical transmission apparatus using a wavelength conversion apparatus in a TDM-PON (Time Division Multiplexing Passive Optical Network) system based on a WDM (Wavelength Division Multiplexing) system, further comprising:
a plurality of combiners/splitters combining a plurality of first wavelength optical signals received from a plurality of ONUs (optical network units) or demultiplexing the plurality of first wavelength signals transmitted to the ONUs;
a plurality of wavelength conversion apparatuses converting the multiplexed first wavelength optical signals into a plurality of second wavelength optical signals;
a multiplexer/demultiplexer multiplexing the plurality of second wavelength optical signals and transmitting the multiplexed second wavelength optical signals to an OLT (optical line terminal) or demultiplexing a third wavelength optical signal received from the OLT and transmitting the demultiplexed third wavelength optical signal to the combiners/splitters; and
an optical circulator inducing the demultiplexed third wavelength optical signal to the combiners/splitters, the combined first wavelength optical signals to the wavelength conversion apparatuses, and the second wavelength optical signals to the multiplexers/demultiplexers.

15. The optical transmission apparatus of claim 12, further comprising:
a multiplexer multiplexing data to be uplinked from the ONU to the OLT and the electric signals converted by the optical receiver; and
a subscriber optical receiver converting a third wavelength optical signal downlinked from the OLT to the ONU into another electric signal.

16. An optical transmission method using a wavelength conversion apparatus in a TDM-PON system based on a WDM system, comprising:
combining a plurality of first wavelength optical signals received from a plurality of ONUs;
converting the combined first wavelength optical signal into an electric signal;
converting the electric signal into a second wavelength optical signals;
transmitting the first and second wavelength optical signals via a transmission line;
splitting the first wavelength optical signals transmitted to the transmission line from the second wavelength optical signals to be uplinked to the transmission line; and
multiplexing a plurality of the second wavelength optical signals and transmitting the plurality of second wavelength optical signals to an OLT.

17. The optical transmission method of claim 16, wherein the first wavelength optical signals comprise time division multiplexed data components.

18. The optical transmission method of claim 16, wherein the first wavelength optical signals are wavelength band optical signals of a TDM-PON, and the second wavelength optical signals are wavelength band optical signals of a WDM-PON.

19. The optical transmission method of claim 16, further comprising:
multiplexing data to be uplinked from the ONUs to the OLT and the electric signal converted from the combined first wavelength optical signal; and
converting a third wavelength optical signal downlinked from the OLT to the ONUs into another electric signal.

20. The optical transmission method of claim 16, further comprising DC-amplifying the electric signal.

* * * * *